Figure 1:
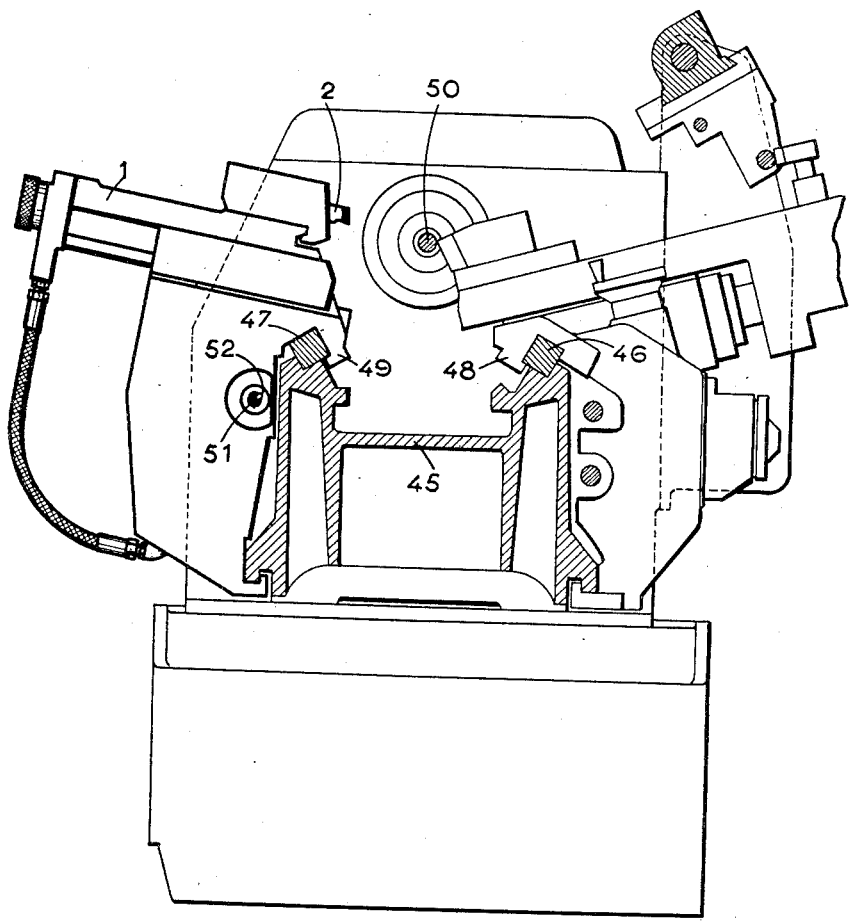

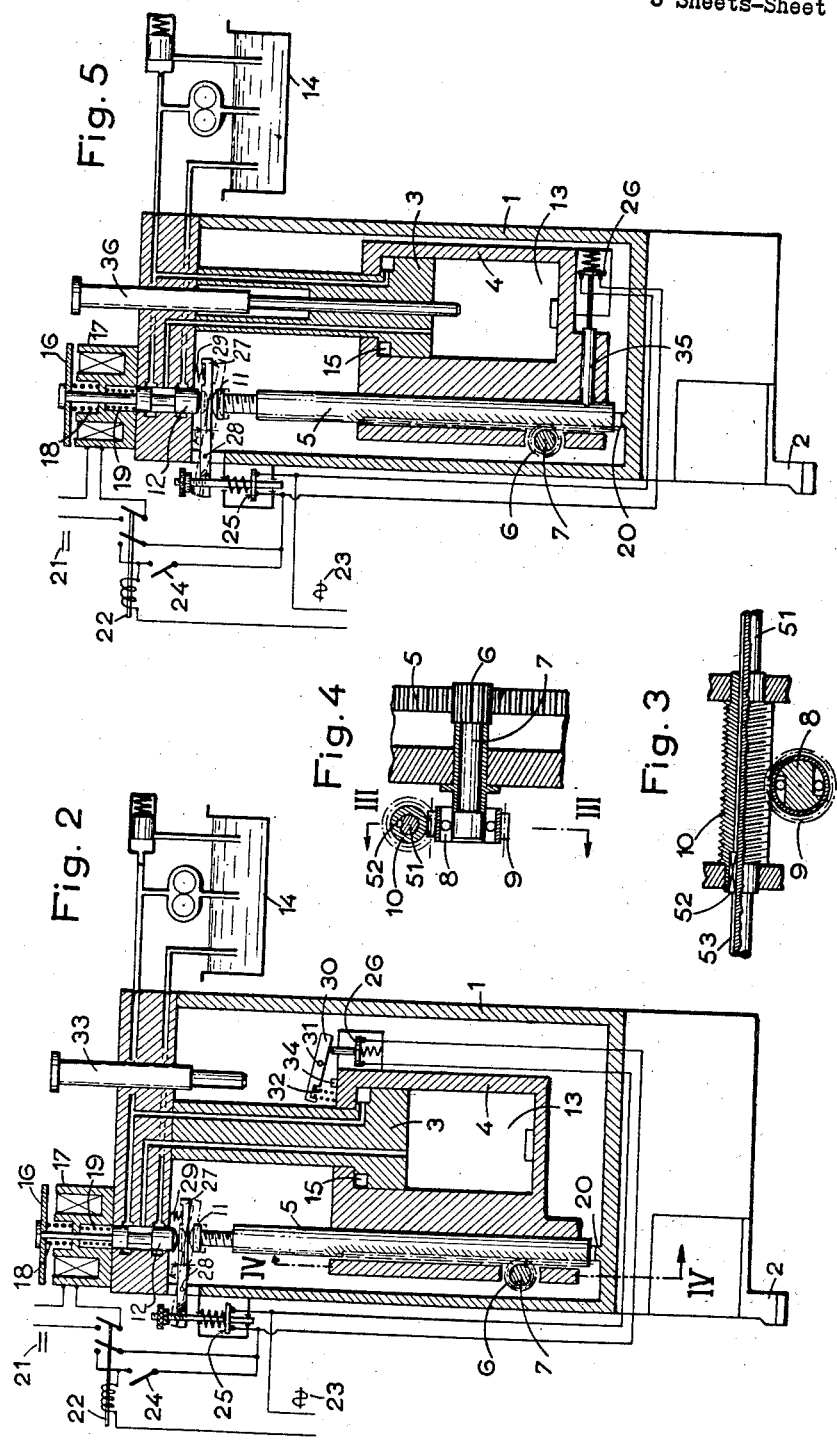

Dec. 25, 1962 R. J. N. LE BRUSQUE 3,069,948
REVERSING DEVICE FOR MACHINE TOOL ADVANCE-RETREAT
MECHANISMS OF THE PAUSE-BEFORE-RETREAT TYPE
Filed Sept. 29, 1959
3 Sheets-Sheet 3
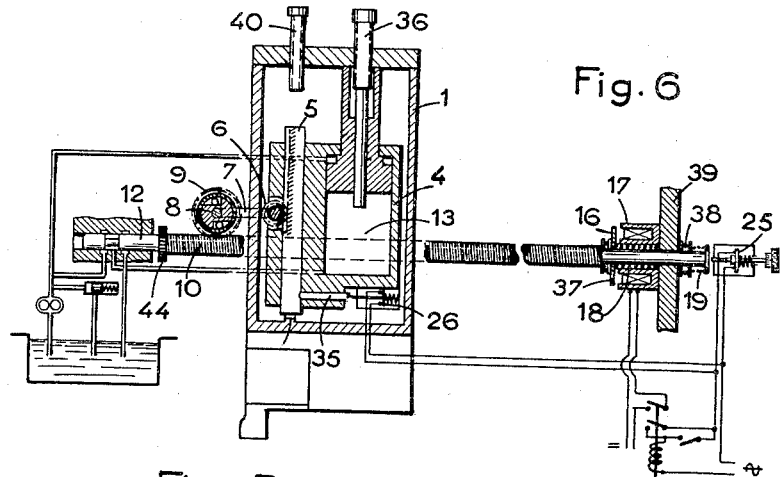
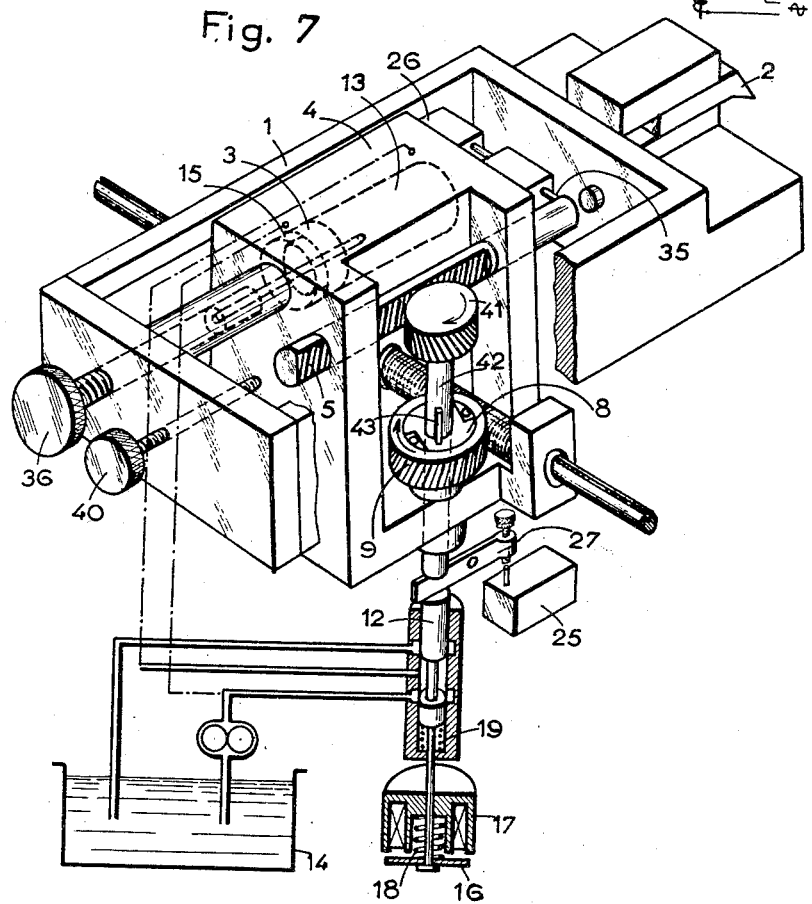

United States Patent Office 3,069,948
Patented Dec. 25, 1962

3,069,948
REVERSING DEVICE FOR MACHINE TOOL ADVANCE-RETREAT MECHANISMS OF THE PAUSE-BEFORE-RETREAT TYPE
René Jean Nicolas le Brusque, Malakoff, France, assignor to H. Ernault-Batignolles, Paris, France, a company of France
Filed Sept. 29, 1959, Ser. No. 843,163
Claims priority, application France Oct. 8, 1958
3 Claims. (Cl. 82—21)

The present invention relates to reversing devices for advance-retreat mechanisms more particularly, the present invention relates to mechanisms used for tool-holding carriages for machine tools which are operative by removing metal through relative rotational movement of the workpiece and the tool.

In a lathe, for example, it is necessary to maintain the tool-holding carriage in its end-of-working-travel position (controlled by stops) until the tool has actually completed the turning operation. Indeed, retreat on the part of the tool-holding carriage at the very instant when the tool reaches the end of its travel would result in the formation of a shoulder which would not be a body of revolution.

To this end, it has hitherto been proposed to utilize for advance-retreat mechanism reversing devices incorporating delaying components such as relays which are inserted into the exciter circuit of an actuating electro-magnet and which cooperate with a mechanical stop. Such delaying components have the drawback that they require the introduction of a "time" factor which varies with the type of machining to be carried out and hence necessitate special adjustment in each individual case, for too short a time would not adequately remedy the imperfection in the machining, while too protracted a pause would cancel out, at any rate in part, the saving in time obtained by the rapid approach travel customarily made. Furthermore, it is necessary to take due account of the often uncertain working of chronometric delaying devices.

The present invention allows a delaying action to be achieved which is measured not in time but by the number of revolutions made by the machine's spindle subsequent to arresting of the carriage's feed motion.

The reversing device according to the invention comprises a mechanical stop designed to immobilize the tool-holding carriage at the end of its feed travel, a reversing member proper places said mechanism in tool-reversing position, and revolution-counting means which is triggered in response to immobilization of said carriage by said stop and which is capable of actuating said reversing member after a predetermined number of further revolutions of the work-piece relative to the tool.

One specific embodiment of the invention relates to well-known devices such as the one forming the object of French Patent No. 1,075,193 and in which the regulating valve of the hydraulic system for controlling carriage advance and retreat-initiated by an electromagnet—is subordinated to the lathe feed-control mechanism via a worm and gear combination and freewheeel mechanism inserted between this combination, and a rack the movements of which are controlled by the carriage. In this specific embodiment, and in conformity with the invention, the freewheel mechanism for subordinating the regulating valve to the mechanism controlling the feed incorporates means for maintaining said valves in a position which corresponds to the degree of travel of the carriage, said means being automatically by-passed after a predetermined number of revolutions made by said feed-controlling mechanism from the moment when the feed motion ceases.

The invention will be more clearly understood from the detailed description which follows and from an examination of the accompanying drawings which illustrate, by way of example only and not in any limiting sense, several possible embodiments of the invention.

In these drawings,
FIG. 1 is a cross-section through the bed of a parallel lathe, giving an overall view in which bold lines are used to show the arrangement of a cross-traversing tool-holder carriage;
FIG. 2 is an overall schematic view showing one possible embodiment of the controlling device;
FIGS. 3 and 4 are respectively sectional views through II—II and III—III in FIG. 1;
FIG. 5 is an overall view showing a variant of the controlling device according to FIG. 1;
FIG. 6 is an overall view showing a second embodiment of the controlling device;
FIG. 7 is an overall view showing, in perspective, a third embodiment of the device.

In FIGS. 2 to 5 are to be found the basic component elements of the device described in the aforementioned patent.

The bed 45 of the parallel lathe, schematically illustrated in the cross-section in FIG. 1, carries a longitudinal-traverse carriage 48 guided along a slide 46 and a cross-traversing carriage 1 carried on a support 49 which is guided along a slide 47. The carriage 1 carries a cutting tool 2 which is intended to carry out machining operations on a work-piece 50 mounted in the lathe spindle under monitoring by a device according to the invention.

The mechanism for controlling feed motion of the transverse carriage 1 comprises a bar 51 which may be common to several carriages and which as shown in FIGS. 3 and 4, drives the feed screw 10 through the medium of a key 52 which is integral with the screw and capable of sliding inside a groove 53 cut into the bar 51.

As shown in FIG. 2, for example, the movable carriage 1 carrying the tool 2 is integral with a piston 3 sliding in a fixed cylinder 4. Inside the body of the cylinder 4 is guided a rack 5 which meshes with a pinion 6 keyed to a shaft 7 which, on its other end, carries a freewheel mechanism 8 (see FIGS. 3 and 4) incorporated inside a helical gear 9 which is in constant mesh with the screw 10 of the feed control mechanism. The rack 5 carries an adjustment screw 11 which allows controlling the distance between the rack and a pilot valve 12 which controls, on the one hand, intake of the liquid under pressure into the chamber 13 below the piston 3 and, on the other hand, drainage of the liquid contained in this chamber into the tank 14. The annular chamber 15 above the piston 3 is constantly supplied with liquid under pressure.

The slide valve 12 is linked to the armature 16 of an electromagnet 17; a spring 18 tends to maintain the slide valve 12 in the lifted position wherein communication between the chamber 13 and the tank 14 is interrupted. A spring 19, which is weaker than the spring 18, tends to thrust the slide valve 12 in the direction required to establish said communication.

The working principle of such a layout is well known.
In the static position illustrated, the pressure in the chamber 13, which has a greater section than the annular chamber 15, maintains the piston 3 in the uppermost position.

As the electromagnet 17 is energized, the spring 18 is compressed and the slide valve is freed from the action of the spring 18 and thrust downwards by the spring 19 as it expands; pressure within the chamber 13 drops and, under the pressure prevailing in the annular chamber 15, the piston descends rapidly and drags with it the tool-holding carriage 1. As soon as the slide valve 12 comes in contact with the adjustment screw 11, the rack 5 is driven along but is controlled by the rotational movement of the screw 10 due to the presence of the freewheel mechanism 8. Since the speed of displacement of the rack is thus kept below that of the carriage 1, this results in displacement of the slide valve 12 in a direction tending to choke off communication between the chamber 13 and the tank 14. This being so, the tool-holding carriage 1 travels along at the speed allowed the rack 5 by the screw 10.

In this well-known arrangement, at the end of the working range of travel—which may be controlled, say, by a limit switch cooperating with an adjustable stop—cutting off of the exciter current to the electromagnet 17 causes the slide valve 12 to rise under the impulse of the spring 18, while the restoring of full pressure in the chamber 13 makes the piston 3 rise to its uppermost position; a stop 20, provided on the moving carriage 1, moves the rack 5 back to its starting position.

If the electromagnet exciter current is cut off at the very instant when the carriage 1 reaches the end of its working range of travel, the carriage begins its return traverse before the tool has produced a shoulder with a perfect surface of revolution, and it therefore becomes necessary to introduce a delay into the impulse controlling cutting out of the electromagnet and, furthermore, carriage feed motion has to be arrested by means of a mechanical stop.

To this end, the device according to the invention includes means described hereinafter which achieve such a delay measured not in terms of time but controlled by the screw 10; in other words—since this screw and the lathe spindle are mechanically coupled—a delay that corresponds to a predetermined number of revolutions of the spindle.

FIG. 2 shows that excitation of the electromagnet 17 by a source of direct current 21 is controlled by an electromagnetic type contactor 22 fed by a source of alternating current 23. A hand switch 24 allows the contactor 22 to be energized, feeding being effective, however, only if one or the other of two switches 25 and 26, inserted into the contactor circuit 22 and located on the carriage 1 and the body of the fixed cylinder 4 respectively, is likewise closed.

The switch 25 is operated by a lever 27 which is pivoted on the carriage 1 at 28 and is subjected to the action of a spring 29. This lever is interposed between the slide valve 12 and the adjustment screw 11, the latter being integral with the rack 5, a lost motion connection is interposed between the switch 25. The lost motion is designated by "A".

The switch 26 is operated by a lever 30 pivoted onto the body of the cylinder 4 at 31 and subject to the action, in the direction of closure of the switch 26, of a spring 32. This lever 30 is interposed between the body of the cylinder 4 and the end of an adjustment screw 33 integral with the carriage 1. Pivoting motion of the lever 30 is limited by a stop 34.

This being so, the working principle of the device is as follows:

As the feed motion begins, the switch 25 is open and the switch 26 is ready to feed the electromagnetic type contactor 22, this feeding action being ensured by closure of the hand-operated switch 24. The electromagnet 17 is then excited and causes the slide valve 12 to move downwards. Under the action of the pressure in the chamber 15, the piston 3 moves at high speed until the moment when the slide valve 12 comes to bear, via the lever 27, against the adjustment screw 11; under the reaction of the rack 5, the rate of displacement of which is restricted to that of the screw 10 through the medium of the freewheel 8, the spring 29 is compressed and the switch 25 closes, while the slide valve 12 controls the rate of advance of the piston 3 in the known manner. At the end of the working range of travel, the adjustment screw 33 causes the lever 30 to pivot, thus opening the switch 26; in coming to bear against the stop 34, the lever 30 then constitutes a fixed stop for the screw 33, and the feed motion of the moving carriage 1 is thereby arrested.

Since the switch 25 is still closed, the electromagnet 17 remains excited; under the combined action of the springs 19 and 29 on the beam-lever 27, the latter continues to thrust away the rack 5—which remains subordinated to movement of the screw 10—until such time as, in moving away from the beam-lever 27, the rack 5 has allowed the springs 19 and 29 to re-expand; a lost motion connection is interposed between the switch means 25 and the reciprocable valve element 5 to permit the slide valve to move under the action of springs 19 and 29 a sufficient distance corresponding to a predetermined number of revolutions of the spindle before permitting switch to open and cut off the supply to the electromagnetic contactor 22, which in turn cuts off the exciter current to the electromagnet 17; the spring 18 restores the slide valve 12 to its uppermost position, and the fact that full pressure is thereby produced in the chamber 13 causes rapid retreat of the moving carriage.

The delay which is thus introduced corresponds to a well defined additional stroke of the rack 5 and, hence, to a predetermined number of revolutions of the spindle further to the end of the feed motion of the carriage.

In the embodiment shown in FIG. 5, the electric control circuit is laid out in the same way as in the case represented in FIG. 2, but the switch 26, instead of being operated by an adjustment screw 33, is operated by a catch 35 which is guided within the body of the cylinder 4 and which engages with a notch cut in the rack 5, when the latter is in its uppermost, or at-rest position. In addition, the role of end-of-work-travel stop for the carriage 1 is assumed by an adjustment screw 36 positioned at the centre of the rod of the piston 3.

The working principle is similar to that described for the case of FIG. 2, but opening of the switch 26 takes place as soon as the rack 5, driven downwards at the end of the approach travel, and after closure of the switch 25 by the beam-lever 27, thrusts away the catch 35. Working traverse ceases as soon as the adjustment screw 36 abuts against the bottom of the cylinder 4, whereas the rack continues its extra movement and, after a definite number of revolutions by the spindle, provokes opening of the switch 25.

This layout offers the advantage that it initiates reverse traverse of the carriage 1 as soon as the force opposing forward traverse of the carriage exceeds a predetermined value, for instance as the result of deterioration of the cutting tool.

When such is the case, the rack 5 pursues its movement after slow-down or complete stoppage of the carriage at any given point and, on completion of this extra movement, the switch 25 opens and causes the carriage to return to its starting position; a safety feature is thus provided which offers protection against possible snags that might arise through rupture or accentuated wear of the tool, or through any other reason liable to produce an abnormal rise in the pressure.

In the embodiment illustrated in FIG. 6, the slide valve 12 and the electromagnet 17, instead of being mounted coaxially with the rack 5, are arranged coaxially with the screw 10 (which, in this case is a lead screw), i.e. upon components which are integral with the fixed stand of the machine. This arrangement makes it possible to avoid leading electric cables up to the moving carriage; on the other hand, it precludes control of a plurality of carriages by the same lead screw.

In FIG. 6, the reference numerals are the same as those used to designate the corresponding component elements in FIGS. 2 to 5.

At one end, the lead screw 10 is integral with the slide valve 12; at its other end it is subjected, on the one hand, to the action of the spring 18 via a ball-bearing stop 37 and the armature 16 of the electromagnet 17, and, on the other, in the opposite direction, to the action of the spring 19 which, through the medium of a ball-bearing stop 38, bears against the fixed stand 39.

The lead screw 10, which is driven in rotation by a pinion 44, is in constant mesh with the helical gear 9 in which is housed the freewheel mechanism 8 integral with the shaft 7, the latter carrying the pinion 6 which meshes with the rack 5.

The mobile carriage 1 carries an adjustment screw 40 which is designed to come into contact with the rack 5 immediately after completion of the carriage's rapid traverse motion.

The electric circuit is identical to that defined in respect of FIGS. 2 to 5.

In this layout, the working principle is as follows:

In the position illustrated, the spring 18 thrusts the lead screw 10 and, hence, the slide-valve 12 leftwards; the pressure is effective in both chambers of the cylinder 4, and the carriage 1 is in its rearward position. The lead screw 10 is able to rotate without affecting the slide-valve 12, due to the fact that the direction of rotation of the gear 9 is such that freewheeling occurs in the mechanism 8.

When the electromagnet 17 is excited, the spring 18 is compressed and the lead screw 10, being freed from the action of the spring 18, shifts to the right under the action of the expanding spring 19 and, by causing the chamber 13 to drain, provokes feed motion of the carriage. In this case the switch 25 has been fetched into its open position, the switch 26 remaining closed.

After the carriage has completed its designed rapid traverse motion, the adjustment screw 40 comes up against the rack 5 and draws the latter along with it. The freewheel 8 becomes integral with the gear 9 and thrusts the lead screw towards the left, while from that moment onwards the slide-valve 12 controls the working traverse of the carriage. In the process, the switch 25 has closed once more and the switch 26 being opened by the catch 35. At the end of the working stroke, the adjustment screw 36 comes up against the bottom of the cylinder. Due to the fact that the gear 9 has been locked in the direction corresponding to rising motion of the rack by the adjustment screw 40, the lead screw 10, in continuing to rotate and under the action of the spring 19, moves towards the right and after taking up lost motion in a lost motion device between switch 25 and lead screw 10 opens the switch 25 which thus causes cutting off of the exciter current to the electromagnet 17. Under the action of the spring 18, the lead screw 10 is returned to the left, and the full pressure which is admitted into the chamber 13 of the cylinder 4 causes rapid return of the carriage 1 to its starting position, the freewheel 8 becoming decoupled from the gear 9. The rack 5 is restored to its starting position by the stop 20.

As in the layout illustrated in FIG. 5, return of the carriage to its starting position is effected automatically in the event of any overload resisting the forward motion of the carriage.

FIG. 7 shows yet a further embodiment of the device.

This figure does not show the electromagnet control circuit, which is identical to the one described precedingly; in addition, the same reference numerals have been retained to designate the component elements corresponding to those in FIGS. 2, 5 and 6.

In this particular embodiment, the rack 5 features an inclined set of teeth, preferably at an angle of forty-five degrees, which meshes with a helical gear 41 integral with a vertical shaft 42 capable of sliding through the freewheel 8, but rotationally integral therewith through the presence of a keying device 43.

Coaxially with the shaft 42 are arranged, on the one hand, the slide-valve 12 with interposed beam-lever 27 controlling the switch 25 through a lost motion device and, on the other, the electromagnet 17.

In the at-rest position illustrated, the carriage 1 is maintained in its retracted position by the pressure admitted into the chamber 13 of the cylinder 4.

As the electromagnet is energized, the spring 19 causes the slide-valve 12 to rise, thus bringing about the rapid feed motion of the carriage; the shaft 42 is likewise thrust upwards, while the beam-lever 27 causes the switch 25 to open. The switch 26 is closed.

When, at the end of the rapid approach traverse, the adjustment screw 40 abuts against the rack 5, the latter drives the shaft 42 and, hence, the freewheel 8, which becomes integral with the gear 9 which is itself driven by the screw 10, the latter in this case filling a role which is identical to that involved in the embodiments shown in FIGS. 2 and 5. As soon as locking of the freewheel takes place, the shaft 42, due to the inclined set of teeth on the rack 5 and the helical gear 41, is caused to descend, drawing with it the slide-valve 12, the latter then controlling the working feed of the carriage. In the process, the switch 25 has closed and the switch 26 been opened by the catch 35.

At the end of the feed traverse, the adjustment screw 36 has abutter against the bottom of the working cylinder. This being so, the spring 19 is able to raise the slide-valve 12 as well as the shaft 42. Since the rack 5 is restricted by the adjustment screw 40, the gear 41 is made to rotate during its ascending motion, this rotation being controlled by the screw 10 through the medium of the freewheel mechanism. At the end of the rising motion, a lost motion device permits sufficient movement of the slide valve 12 through a distance A to permit a predetermined number of revolutions of the spindle before allowing switch 25 to open. As switch 25 opens, de-excitation of the electromagnet 17 causes rapid return of the carriage to its starting position.

Like those shown in FIGS. 5 and 6, the device in FIG. 7 provides for automatic return of the carriage to its starting position in the event of an overload resisting feed motion of the carriage.

It is to be clearly understood that the invention is not limited to the examples described and illustrated, it being capable of being modified, depending upon the particular application, without this entailing a departure from the scope of the invention.

Thus, for instance, the return spring action ensuring a normally open condition for the exciter circuit of the electromagnet may be achieved by any means other than the beam-lever 27, or else by axial displacement either of the feed screw or of the coupling shaft between the rack and the freewheel mechanism.

What is claimed is:

1. A machine tool having a hydraulically reciprocable cross slide, a work piece area adapted for accommodating a workpiece and a control system for controlling reciprocation of said cross slide to and from said work piece area, said control system comprising a valve member movable between advance and return positions, first resilient means to urge said valve member towards said return position, second resilient means weaker than said first resilient means to urge said valve member towards said advance position, electromagnetically operated means effective, upon energization, to render said first resilient means inoperative, switch means for controlling the energization of said electromagnetically operated means, a reciprocable element engaged by said cross slide to reciprocate therewith, a rotatable element driven so as to rotate at substantially the same speed as that of a rotating work piece, one of said elements constituting a valve actuating element adapted to move said valve member against the action of said second resilient means, and a free wheel mechanism being constituted by first and second components, one of said components having a driving connection with said reciprocable element and the other component having a driving connection with said rotatable element, the direction of working of said free wheel mechanism being such that advance movement of said reciprocable element at such a speed as to impart to said one component a rotational speed greater than that of said other component locks said free wheel mechanism and causes said valve actuating element to displace said valve member against the action of said second resilient means to adjust the speed of advance movement of said cross slide in accordance with the rotational speed of said rotatable element, said switch means being operable by said valve actuating element at the end of the advance of said cross slide in such a manner as to interrupt the energization of said electromagnetically operated means after displacement of said valve actuating element under the action of said second resilient means over a distance corresponding to at least one revolution of work piece rotation.

2. A control system as claimed in claim 1 wherein said switch means comprises a first circuit constituted by first and second switches connected in parallel with one another, a third switch manually operated and in series with said first and second switches, a relay in series with said third switch and a source of alternating current coupled to the first circuit, a second circuit comprising said electromagnetically actuated means, a switch in series with said electromagnetically actuated means operated by said relay, a source of direct current coupled to the second circuit whereby upon the closing of the first circuit the relay operates the switch of the second circuit to complete the second circuit and energize the electromagnetically actuated means.

3. A control system as claimed in claim 2 comprising a first lever having two extremities, said first lever being pivotally attached to said cross slide, a spring attached to one of said extremities of said first lever and said cross slide, said first switch being resiliently attached to the other of said extremities of said first lever, said first lever being interposed between said valve member and said reciprocable element and being operable by said reciprocable element to close said first switch and said valve member to open said first switch, a fixed member, a second lever having two extremities and being pivotally attached to said fixed member, a spring attached to one of said extremities of said second lever, said second switch being resiliently attached to said other extremity of said second lever and closed in a first position, an adjustment screw rigidly fixed to said cross slide and upon reciprocation of said cross slide urging said second lever to open said second switch.

References Cited in the file of this patent
UNITED STATES PATENTS

| | | |
|---|---|---|
| 2,585,215 | Bickel et al. | Feb. 12, 1952 |
| 2,840,956 | Grinage | July 1, 1958 |
| 2,855,752 | LeBrusque | Oct. 14, 1958 |
| 2,916,017 | Lamb | Dec. 8, 1959 |

UNITED STATES PATENT OFFICE
CERTIFICATE OF CORRECTION

Patent No. 3,069,948                          December 25, 1962

René Jean Nicolas le Brusque

It is hereby certified that error appears in the above numbered patent requiring correction and that the said Letters Patent should read as corrected below.

In the heading to the printed specification, line 9, for "Claims priority, application France Oct. 8, 1958" read -- Claims priority application France Oct. 2, 1958 --.

Signed and sealed this 30th day of July 1963.

(SEAL)
Attest:

ERNEST W. SWIDER                             DAVID L. LADD
Attesting Officer                                Commissioner of Patents